United States Patent
Lee et al.

(10) Patent No.: US 10,530,020 B2
(45) Date of Patent: Jan. 7, 2020

(54) CARTRIDGE WITH MOUNT FRAME HAVING LEAD MOUNTING BOARD AND LOWER AND UPPER SLIDING BOARDS AND BATTERY MODULE HAVING SAME

(71) Applicant: LG CHEM, LTD., Seoul (KR)

(72) Inventors: Jeong-Seop Lee, Daejeon (KR); Jong-Woon Choi, Daejeon (KR); Sun-Mo An, Daejeon (KR); Seung-Hun Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 172 days.

(21) Appl. No.: 15/555,140

(22) PCT Filed: Jun. 13, 2016

(86) PCT No.: PCT/KR2016/006270
§ 371 (c)(1),
(2) Date: Sep. 1, 2017

(87) PCT Pub. No.: WO2016/204470
PCT Pub. Date: Dec. 22, 2016

(65) Prior Publication Data
US 2018/0048033 A1   Feb. 15, 2018

(30) Foreign Application Priority Data
Jun. 19, 2015   (KR) .................. 10-2015-0087563

(51) Int. Cl.
*H01M 10/48*   (2006.01)
*H01M 10/6551*   (2014.01)
(Continued)

(52) U.S. Cl.
CPC ....... *H01M 10/482* (2013.01); *H01M 2/1077* (2013.01); *H01M 2/206* (2013.01);
(Continued)

(58) Field of Classification Search
CPC ............. H01M 10/482; H01M 10/613; H01M 10/647; H01M 10/6551; H01M 10/6555; H01M 2/1077; H01M 2/206
(Continued)

(56) References Cited

U.S. PATENT DOCUMENTS

2010/0304203 A1 * 12/2010  Buck .................. H01M 2/1072
                                                          429/120
2013/0122339 A1    5/2013  Chae et al.
(Continued)

FOREIGN PATENT DOCUMENTS

JP    2006344572 A  *  12/2006
KR    10-2012-0005728 A    1/2012
(Continued)

OTHER PUBLICATIONS

International Search Report, issued in PCT/KR2016/006270 (PCT/ISA/210), dated Oct. 6, 2016.

*Primary Examiner* — Sean P Cullen
(74) *Attorney, Agent, or Firm* — Birch, Stewart, Kolasch & Birch, LLP

(57) ABSTRACT

Provided is a cartridge suitable for sensing a voltage of a battery cell through a center region and an edge, wherein two battery cells are provided in an upper portion and a lower portion so as to increase energy density, and a battery module including the cartridge. The cartridge includes: a mount frame including a pair of through windows provided sequentially in a length direction, and a lower sliding board, a lead mounting board, and an upper sliding board sequentially provided in a width direction between the pair of through windows; and cooling fins respectively covering the pair of through windows, wherein the lower sliding board
(Continued)

and the upper sliding board are respectively provided on left and right of the lead mounting board to diagonally face each other.

19 Claims, 15 Drawing Sheets

(51) Int. Cl.
    *H01M 2/20*     (2006.01)
    *H01M 10/6555*     (2014.01)
    *H01M 10/647*     (2014.01)
    *H01M 10/613*     (2014.01)
    *H01M 2/10*     (2006.01)
    *H01M 10/052*     (2010.01)

(52) U.S. Cl.
    CPC ....... *H01M 10/613* (2015.04); *H01M 10/647* (2015.04); *H01M 10/6551* (2015.04); *H01M 10/6555* (2015.04); *H01M 10/052* (2013.01); *H01M 2220/20* (2013.01); *Y02E 60/122* (2013.01)

(58) Field of Classification Search
    USPC .......... 429/156, 158, 159, 160, 162
    See application file for complete search history.

(56) References Cited

U.S. PATENT DOCUMENTS

| 2013/0143086 | A1 | 6/2013 | Lee et al. |
| 2015/0263394 | A1 | 9/2015 | Yoshioka |
| 2016/0133890 | A1* | 5/2016 | Lee ................. H01M 2/1077 429/72 |
| 2016/0268658 | A1 | 9/2016 | Kong et al. |

FOREIGN PATENT DOCUMENTS

| KR | 10-2012-0016351 | A | | 2/2012 | |
| KR | 10-2014-0089627 | A | | 7/2014 | |
| KR | 10-2014-0144473 | A | | 12/2014 | |
| KR | 10-2014-0144781 | A | | 12/2014 | |
| KR | 10-2014-0144948 | A | | 12/2014 | |
| KR | 20140144948 | A | * | 12/2014 | |
| KR | 10-2015-0015169 | A | | 2/2015 | |
| KR | 10-2015-0049461 | A | | 5/2015 | |
| KR | 10-2015-0062942 | A | | 6/2015 | |
| WO | WO 2014/087959 | A1 | | 6/2014 | |
| WO | WO-2015016566 | A1 | * | 2/2015 | .......... H01M 2/1077 |

\* cited by examiner

CARTRIDGE WITH MOUNT FRAME HAVING LEAD MOUNTING BOARD AND LOWER AND UPPER SLIDING BOARDS AND BATTERY MODULE HAVING SAME

TECHNICAL FIELD

The present disclosure relates to a battery module accommodating a battery cell between vertically stacked cartridges, and more particularly, to a cartridge and battery module having an improved structure such that space efficiency is increased in comparison with the same capacity and a thickness of an assembly component is decreased in comparison with the same output voltage.

The present application claims priority to Korean Patent Application No. 10-2015-0087563 filed on Jun. 19, 2015 in the Republic of Korea, the disclosure of which is incorporated herein by reference.

BACKGROUND ART

Recently, in order to reduce air pollution caused by exhaust gases of vehicles, the vehicles are being manufactured based on studies for securing driving power by using an internal combustion engine and/or an electric motor. In this regard, the vehicles have been evolved in an order of a hybrid vehicle, a plug-in hybrid vehicle, and an electric vehicle. In this case, the hybrid vehicle and the plug-in hybrid vehicle include an internal combustion engine, an electric motor, and a battery pack, and the electric vehicle includes an electric motor and a battery pack without an internal combustion engine.

The battery pack includes at least one battery module. The battery module includes cartridges and battery cells. The cartridges are sequentially stacked on each other. The cartridges are tightly combined to each other by using a fastening unit, such as a bolt or the like. Also, the battery cell is located between the two facing cartridges. The battery cell includes a body portion and a pair of electrode leads. The body portion is mounted between the two cartridges, and includes a pouch packing material, and an electrode assembly and electrolyte sealed inside of the pouch packing material.

The electrode leads extends from the inside towards the outside of the body portion, and is formed of a metal plate having a plate shape. Here, the electrode lead protrudes outside of the cartridges through a gap between the cartridges or through a penetration split provided on a contact wall surface of the cartridges. The electrode lead is electrically connected to a neighboring electrode lead in series or in parallel, in consideration of capacity of the battery module or specification of an output voltage in the cartridges. Meanwhile, the number of battery cells of the battery module may increase in order to increase the capacity of the battery module or the size of the output voltage.

At this time, since the battery cells are mounted in the cartridges, when a stacked height of the cartridges increases, the size of the battery module may gradually increase together with the number of cartridges. Accordingly, when the battery pack is restricted from artificially expanding an accommodation space of the battery module, the increase of capacity of battery module or size of output voltage is limited by a structure of the battery pack. Also, the battery pack includes two or more battery modules to have large capacity. The battery modules are arranged in a horizontal direction and/or a vertical direction in the battery pack, and are electrically connected to each other in series or in parallel through a connection component, such as a bus bar, a connector, or the like.

However, the connection component occupies a certain space inside the battery pack because the connection component has any one of various shapes based on a design purpose of the battery pack. Here, when two or more battery modules are accommodated in the battery pack, the number of connection components increases together with the number of battery modules in the battery pack, and the battery pack has small energy density per unit volume according to the used number of connection components.

DISCLOSURE

Technical Problem

The present disclosure is designed based on the background art described above, and the present disclosure is directed to a cartridge suitable for increasing space efficiency in comparison with the same capacity and decreasing a thickness of an assembly component in comparison with the same output voltage by increasing the number of battery cells accommodated in the same level, and for simplifying a voltage sensing structure around the battery cell, and a battery module including the cartridge.

Technical Solution

In one aspect of the present disclosure, there is provided a cartridge including: a mount frame including a pair of through windows provided sequentially in a length direction, and a lower sliding board, a lead mounting board, and an upper sliding board sequentially provided in a width direction between the pair of through windows; and cooling fins respectively covering the pair of through windows, wherein the lower sliding board and the upper sliding board are respectively provided on left and right of the lead mounting board to diagonally face each other.

According to the present invention, the mount frame may include slits respectively penetrating two side walls of the mount frame adjacent to the pair of through windows, wherein the slits may communicate with the pair of through windows.

According to the present invention, the cooling fins may be inserted into the slits and perpendicularly bent along the two side walls of the mount frame.

According to the present invention, the mount frame may include a left groove and a right groove in the width direction between the pair of through windows, and the lower sliding board and the upper sliding board may be respectively provided below the left groove and above the right groove to partially cover the left groove and the right groove.

Preferably, the lead mounting board may be provided between the lower sliding board and the upper sliding board to contact the lower sliding board and the upper sliding board at the left groove and the right groove.

In one aspect, the lead mounting board may include a mounting plate between the left groove and the right groove, a lower extension extending from a lower portion of the mounting plate to the left groove and connected to the lower sliding board, and an upper extension extending from an upper portion of the mounting plate to the right groove and connected to the upper sliding board.

In another aspect, the lower extension may have a thickness smaller than the lower sliding board, and the upper extension may have a thickness smaller than the upper sliding board.

According to the present invention, the mount frame may further include mount fences respectively surrounding the pair of through windows, wherein the mount fences may be located along an edge of the mount frame and protrude toward a lower portion and an upper portion of the mount frame.

Preferably, the mount fences may be opened towards the lead mounting board, and include lead drawing grooves respectively at the lower portion and the upper portion of the mount frame on an opposite side of the lead mounting board.

In one aspect, the mount fences may be spaced from each other by a width of the lower sliding board or the upper sliding board in the length direction of the mount frame.

In another aspect of the present disclosure, there is also provided a battery module including: a cartridge stack including a plurality of cartridges that are sequentially stacked, wherein each of the plurality of cartridges includes: a mount frame comprising a pair of through windows provided sequentially in a length direction, and a left groove, a lead mounting board, and a right groove sequentially provided in a width direction between the pair of through windows; and cooling fins respectively covering the pair of through windows; battery cells provided two apiece at an upper portion of the mount frame or at each of a lower portion and the upper portion of the mount frame of each of the plurality of cartridges, wherein each of the battery cells includes a pair of electrode leads heading opposite directions to each other, and in two battery cells located in a same level, combined end portions of facing electrode leads are provided on the lead mounting board, one of the pair of electrode leads is exposed at a front surface of the cartridge stack, and the other one of the pair of electrode leads is exposed at a rear surface of the cartridge stack; first and second middle sensing structures inserted into the left groove and the right groove of each of the plurality of cartridges, and alternately electrically connected to combined end portions of electrode leads in the plurality of cartridges; and first and second end sensing structures respectively provided at the front surface and the rear surface of the cartridge stack and electrically connected to electrode leads exposed at the front surface and electrode leads exposed at the rear surface.

According to the present invention, from among the plurality of cartridges, a thickness of an uppermost cartridge may be half of a thickness of each of remaining cartridges.

Preferably, each of cartridges below an uppermost cartridge from among the plurality of cartridges may be provided at each of left and right of the lead mounting board, and include a lower sliding board and an upper sliding board facing each other diagonally.

In one aspect, the lower sliding board may be provided below the left groove to partially cover the left groove, the upper sliding board may be provided above the right groove to partially cover the right groove, and the lead mounting board may be connected to the lower sliding board through the left groove and to the upper sliding board through the right groove.

According to the present invention, the mount frame may further include slits each provided on two side walls of the mount frame adjacent to the pair of through windows, wherein the cooling fins may be inserted into the slits through edges of the pair of through windows, protrude from the slits to perpendicularly bend along the two side walls of the mount frame, and be surrounded by two battery cells in a sandwich structure.

In one aspect, the mount frame may further include a mount fence at the upper portion or at the lower and upper portions of each of the plurality of cartridges, wherein the mount fence may perpendicularly protrude in a height corresponding to a thickness of each of the battery cells.

In another aspect, the mount frame may further include mount fences each surrounding the two battery cells located in the same level, wherein each of the mount fences may be opened towards the lead mounting board and comprises a lead drawing groove on an opposite side of the lead mounting board.

According to the present invention, the battery cells may be electrically connected to each other in series by electrode leads exposed at the front surface and the rear surface of the cartridge stack.

According to the present invention, the first middle sensing structure may include a first middle connecting portion inserted into each of the left grooves of the plurality of cartridges, and a first movement blocking portion combined to the first middle connecting portion.

Preferably, the first middle connecting portion may include a plurality of first fingers, a first connection slit at an end portion of each of the plurality of first fingers, and a first insertion guide slit between two adjacent first fingers, wherein the first connection slit may be opened towards the combined end portions of the facing electrode leads, and the first insertion guide slit may be opened towards the lead mounting board facing the first insertion guide slit.

In one aspect, the first connection slit may include a first connection clip formed of a metal, wherein the first connection clip may elastically clip the combined end portions of the facing electrode leads.

In another aspect, the first insertion guide slit may slide to the lower sliding board facing the first insertion guide slit to accommodate the lower sliding board.

In another aspect, the first movement blocking portion may be perpendicularly combined to the first middle connecting portion to contact a side wall of the cartridge stack around the left groove.

In another aspect, the first middle sensing structure may further include a first wire portion electrically connected to the first end sensing structure by being combined to the first movement blocking portion, wherein the first wire portion may include a first leading wire connected to the first connection clip and passing through the inside of the first middle connecting portion and the inside of the first movement blocking portion.

According to the present invention, the second middle sensing structure may include a second middle connecting portion inserted into the right groove of each of the plurality of cartridges, and a second movement blocking portion combined to the second middle connecting portion.

Preferably, the second middle connecting portion may include a plurality of second fingers, a second connection slit at an end portion of each of the plurality of second fingers, and a second insertion guide slit between two adjacent second fingers, wherein the second connection slit is opened towards the combined end portions of the facing electrode leads, and the second insertion guide slit is opened towards the lead mounting board facing the second insertion guide slit.

In one aspect, the second connection slit may include a second connection clip formed of a metal, wherein the second connection clip may elastically clip the combined end portions of the facing electrode leads.

In another aspect, the second insertion guide slit may slide to the upper sliding board facing the second insertion guide slit to accommodate the upper sliding board.

In another aspect, the second movement blocking portion may be perpendicularly combined to the second middle connecting portion to contact a side wall of the cartridge stack around the right groove.

In another aspect, the second middle sensing structure may further include a second wire portion electrically connected to the second end sensing structure by being combined to the second movement blocking portion, wherein the second wire portion may include a second leading wire connected to the second connection clip and passing through the inside of the second middle connecting portion and the inside of the second movement blocking portion.

According to the present invention, the first and second end sensing structures may include a voltage sensing module and an insulating cover covering the voltage sensing module.

Preferably, the voltage sensing module may include a printed circuit board on an inner perimeter surface facing the plurality of cartridges at an edge of one side, and a connector electrically connected to the printed circuit board on an outer perimeter surface facing the insulating cover.

In one aspect, the voltage sensing module may further include support ribs sequentially stacked in a center region, a first sensing bus bar connected to the printed circuit board through one end portion and to an electrode terminal through another end portion on an uppermost support rib, a second sensing bus bar provided on each of the support ribs below the uppermost support rib to connect the printed circuit board, and a lead insulating pattern and a lead drawing slit sequentially provided between two adjacent support ribs.

In another aspect, the voltage sensing module of the first end sensing structure may combine an uppermost electrode lead of an uppermost battery cell to the first sensing bus bar by inserting the uppermost electrode lead to an uppermost lead drawing slit at the front surface of the cartridge stack, and combine a pair of electrode leads of two adjacent battery cells to the second sensing bus bar by inserting the pair of electrode leads to each of the lead drawing slits below the uppermost lead drawing slit.

In another aspect, the printed circuit board of the first end sensing structure may sense electric potential of each of the battery cells contacting the first middle sensing structure by being electrically connected to the first wire portion of the first middle sensing structure and the first and second sensing bus bars of the first end sensing structure.

In another aspect, the voltage sensing module of the second end sensing structure may combine a lowermost electrode lead of a lowermost battery cell to the second sensing bus bar by inserting the lowermost electrode lead to a lowermost lead drawing slit at the rear surface of the cartridge stack, and combine a pair of electrode leads of two adjacent battery cells to the first sensing bus bar or the second sensing bus bar by inserting the pair of electrode leads to each of the lead drawing slits above the lowermost lead drawing slit.

In another aspect, the printed circuit board of the second end sensing structure may sense electric potential of each of the battery cells contacting the second middle sensing structure by contacting the second wire portion of the second middle sensing structure.

In another aspect, the lead insulating pattern may electrically insulate the two adjacent first and second sensing bus bars or may electrically insulate the two adjacent second sensing bus bars below the first sensing bus bar.

Advantageous Effects

Since two battery cells are respectively located at a lower portion and an upper portion of a cartridge according to the present disclosure, space efficiency may be increased in comparison with the same capacity in a battery module while a thickness of an assembly component may be decreased in comparison with the same output voltage, thereby increasing energy density per unit volume of the battery module.

In a battery module according to the present disclosure, since two battery cells are mounted below and above of each of cartridges that are sequentially stacked, the increase of used number of cartridges may be blocked for high capacity of a battery pack and a stacked height of the cartridges may be adequately maintained.

Since a battery module according to the present disclosure includes electrode leads of battery cells at a center region and edges of each of cartridges that are sequentially stacked, sensing structures contacting the electrode leads according to regions of each cartridge may be distributed and a voltage sensing structure may be simplified.

In a battery module according to the present disclosure, since the used number of cartridges in a stacked structure of the cartridges and battery cells is decreased and a combination relationship of sensing structures contacting electrode leads of the battery cells is simplified, manufacturing costs of the battery module may be decreased by decreasing man-hour of workers.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one or more embodiments described below, a battery cell denotes a lithium secondary battery. Here, the lithium secondary battery is a secondary battery inducing an electrochemical reaction in a positive electrode and a negative electrode when lithium ions operate as working ions while charging and discharging are preformed. However, it is obvious that the present disclosure is not limited by a type of battery.

Figure 1:
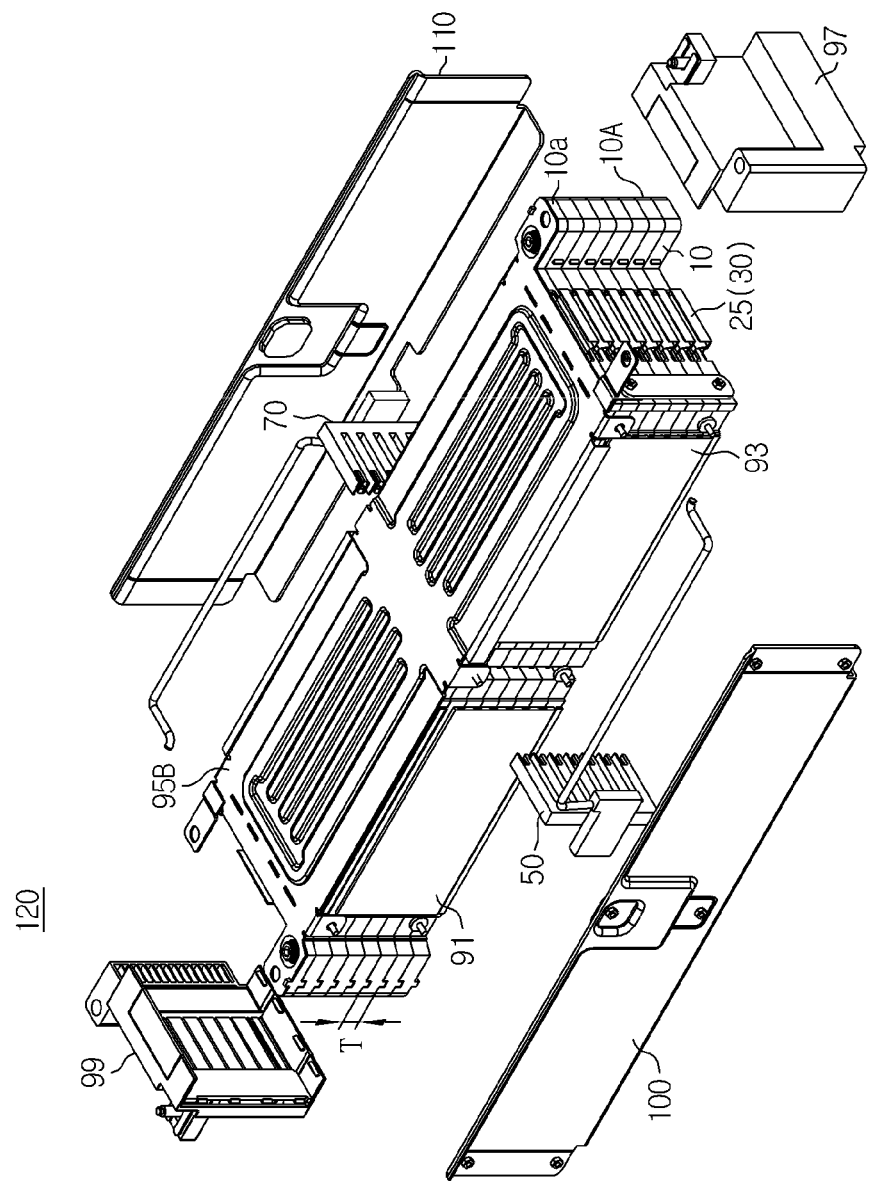
FIG. 1 is an exploded perspective view of a battery module according to an embodiment of the present disclosure.
Figure 2:
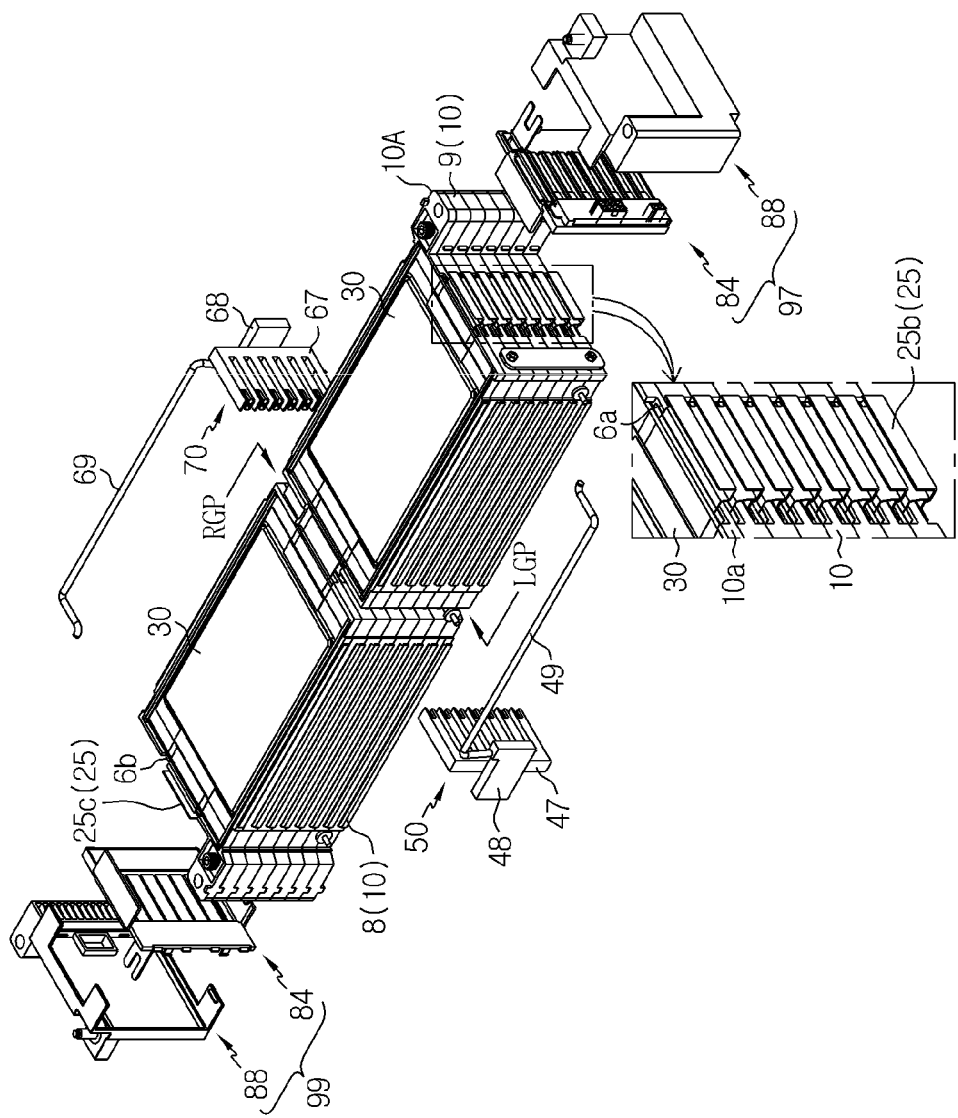
FIG. 2 is an exploded perspective view of a cartridge stack, a plurality of battery cells, first and second middle sensing structures, and first and second end sensing structures of FIG. 1.
Figure 3:
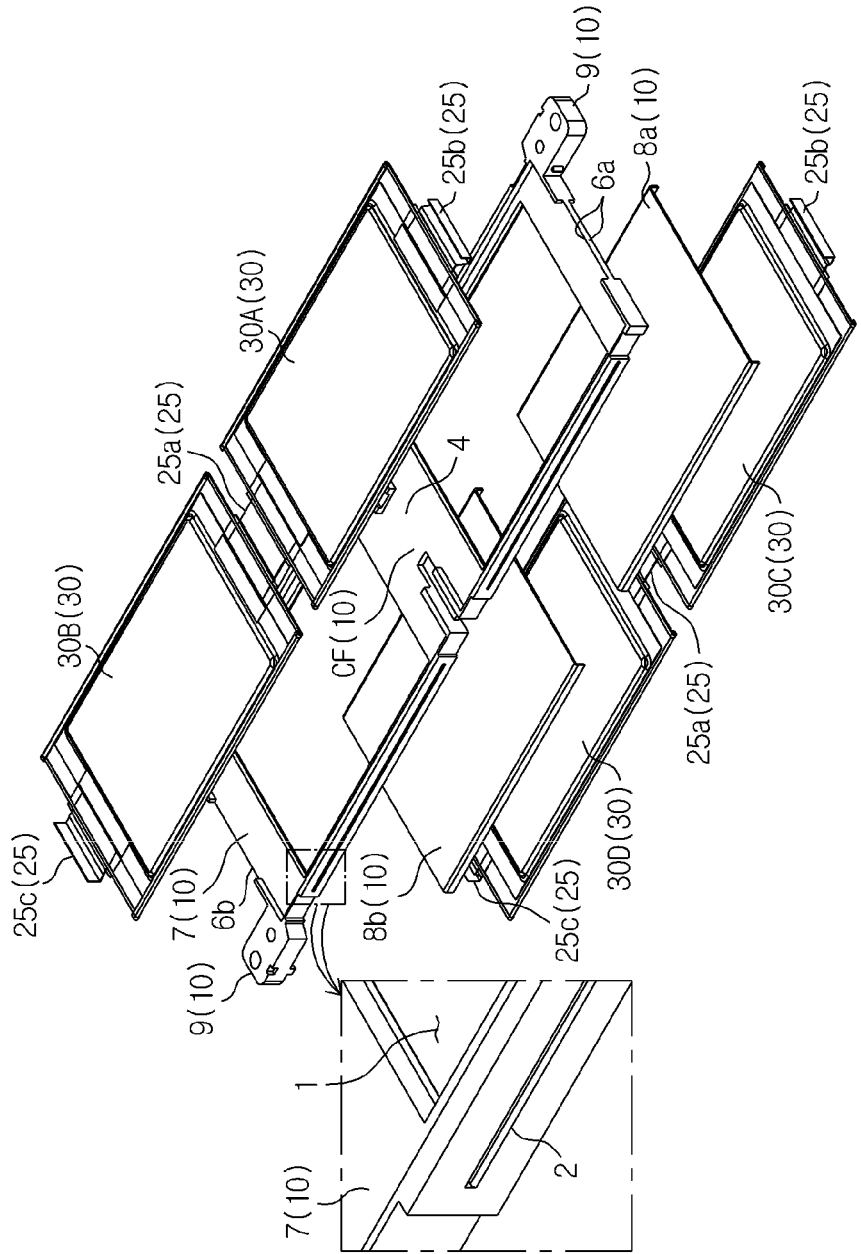
FIG. 3 is an enlarged exploded perspective view of cartridges and battery cells of FIG. 2.

FIG. 1 is an exploded perspective view of a battery module according to an embodiment of the present disclosure, FIG. 2 is an exploded perspective view of a cartridge stack, a plurality of battery cells, first and second middle sensing structures, and first and second end sensing structures of FIG. 1, and FIG. 3 is an enlarged exploded perspective view of cartridges and battery cells of FIG. 2.

Figure 16:
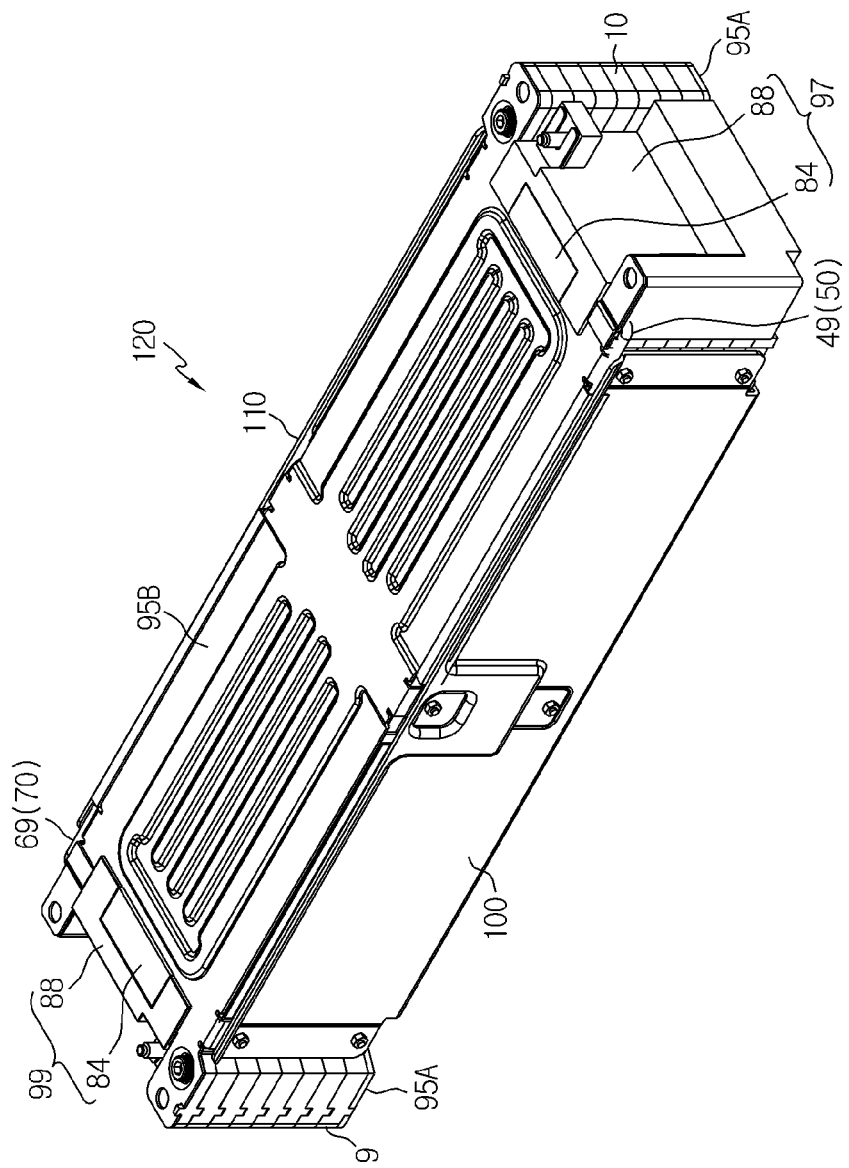

Referring to FIGS. 1 through 3, battery module 120 includes a cartridge stack 10A, battery cells 30, first and second middle sensing structures 50 and 70, heat transfer pads 91 and 93, lower end plate 95A of FIG. 16, an upper end plate 95B, first and second end sensing structures 97 and 99, and side plates 100 and 110. The cartridge stack 10A includes cartridges 10 that are sequentially stacked on each other.

Preferably, in the cartridge stack 10A, an uppermost cartridge 10a has a structure in which a middle point of a thickness T of the cartridge 10 below the uppermost cartridge 10a is cut along a horizontal plane. A thickness of the uppermost cartridge 10a is half of the thickness T of the cartridge 10 below the uppermost cartridge 10a. According to an embodiment, when viewed in a length direction, the cartridge stack 10A has a left groove portion LGP on a left side wall and a right groove portion RGP on a right side wall based on a center region.

The left groove portion LGP accommodates the first middle sensing structure 50 having a finger structure, and the right groove portion RGP accommodates the second middle sensing structure 70 having a finger structure. The battery cells 30 are mounted in the cartridges 10. For example, the uppermost cartridge 10a mounts the two battery cells 30 electrically connected in series thereabove, and each of the cartridges 10 below the uppermost cartridge 10a mounts the two battery cells 30 electrically connected in series therebelow and thereabove.

Preferably, the battery cell 30 includes two electrode leads 25 in two directions. The battery cell 30 has a pouch shape. In detail, the battery cell 30 includes a pouch packing material sealing an electrode assembly and electrolyte, and a pair of the electrode leads 25 electrically connected to the electrode assembly inside the pouch packing material and extending from the inside to the outside of the pouch packing material. The electrode lead 25 has a negative (−) or positive (+) electric polarity.

On one surface of the uppermost cartridge 10a or the cartridge 10 below the uppermost cartridge 10a, the two battery cells 30 are electrically connected in series by overlapping end portions of electrode leads 25a having opposite polarities and combining the end portions of the electrode leads 25a via laser welding or the like. The combined end portions of the electrode leads 25a are mounted on a lead mounting board 4 provided in a center region of the one surface of the uppermost cartridge 10a or the cartridge 10 below the uppermost cartridge 10a.

Also, electrode leads 25b and 25c that are not combined in the two battery cells 30 are roughly perpendicularly bent, and are exposed towards the outside of the uppermost cartridge 10a or the cartridge 10 below the uppermost cartridge 10a through lead drawing grooves 6a and 6b in front of and at the rear of the uppermost cartridge 10a or the cartridge 10 below the uppermost cartridge 10a.

For convenience of description, the cartridge 10 below the uppermost cartridge 10a will be described in substitution for the uppermost cartridge 10a. The cartridge 10 includes a battery cell 30A in front and a battery cell 30B at the rear on one surface, and includes a battery cell 30C in front and a battery cell 30D at the rear on the other surface facing the one surface.

Here, the electrode leads 25b and 25c of the battery cells 30A and 30B may be combined and electrically connected in series to the electrode leads 25b and 25c of the battery cells 30C and 30D through the lead drawing grooves 6a and 6b of the cartridge 10. In detail, when the electrode leads 25b of the battery cells 30A and 30C or the electrode leads 25c of the battery cells 30B and 30D are overlapped and combined via laser welding or the like, the battery cells 30A, 30B, 30C, and 30D may be electrically connected in series through the lead drawing grooves 6a and 6b of the cartridge 10.

The first and second middle sensing structures 50 and 70 may be respectively inserted into the left groove portion LGP and the right groove portion RGP of the cartridge stack 10A. Preferably, the first and second middle sensing structure 50 and 70 include a plurality of branched fingers, wherein an end portion of each finger may contact the combined end portions of the electrode leads 25a mounted on the lead mounting board 4 at the center region of the cartridge 10.

In FIG. 1, the heat transfer pads 91 and 93 are provided on side walls of the cartridge stack 10A by being located perpendicularly to the first and second middle sensing structures 50 and 70. Preferably, each of the heat transfer pads 91 and 93 contacts a cooling fin 8 of FIG. 2 formed of a metal inserted into the cartridge 10, and emits heat of the battery cells 30 mounted in the cartridge 10 to the outside of the cartridge stack 10A by receiving the heat from the cooling fin 8.

According to an embodiment, the heat transfer pads 91 and 93 are formed of a metal having satisfactory thermal conductivity. The lower end plate 95A and the upper end plate 95B may be combined to the cartridge stack 10A by being respectively provided on a lower surface and an upper surface of the cartridge stack 10A. Preferably, the lower end plate 95A and the upper end plate 95B protects the uppermost battery cell 30 and the lowermost battery cell 30 in the cartridge stack 10A, and externally emits heat of the battery cells 30.

The lower end plate 95A and the upper end plate 95B are screw-combined with the cartridge stack 10A, and are formed of a metal having satisfactory mechanical rigidity and thermal conductivity. In FIG. 2, the first and second end sensing structures 97 and 99 face each other around the cartridge stack 10A in a length direction of the cartridge stack 10A.

Also, the first and second end sensing structures 97 and 99 electrically contacts the electrode leads 25b and 25c exposed from the lead drawing grooves 6a and 6b of the cartridges 10. Preferably, the first and second end sensing structures 97 and 99 include a voltage sensing module 84 and an insulating cover 88. The voltage sensing module 84 includes first and second sensing bus bars 84C and 84D of FIG. 10 electrically connected to the electrode leads 25b and 25c of the battery cells 30.

The insulating cover 88 covers the voltage sensing module 84. In FIG. 1, the side plates 100 and 110 are provided on the heat transfer pads 91 and 93 and externally emit heat of the battery cells 30 by receiving the heat from the heat transfer pads 91 and 93. The side plates 100 and 110 are formed of a metal, and may be screw-combined to the lower and upper end plates 95A and 95B.

Next, a structure of the cartridge 10 where a pair of battery cells are mounted on a lower portion and an upper portion will be described in detail with reference to FIGS. 3 through 5.

Figure 4:
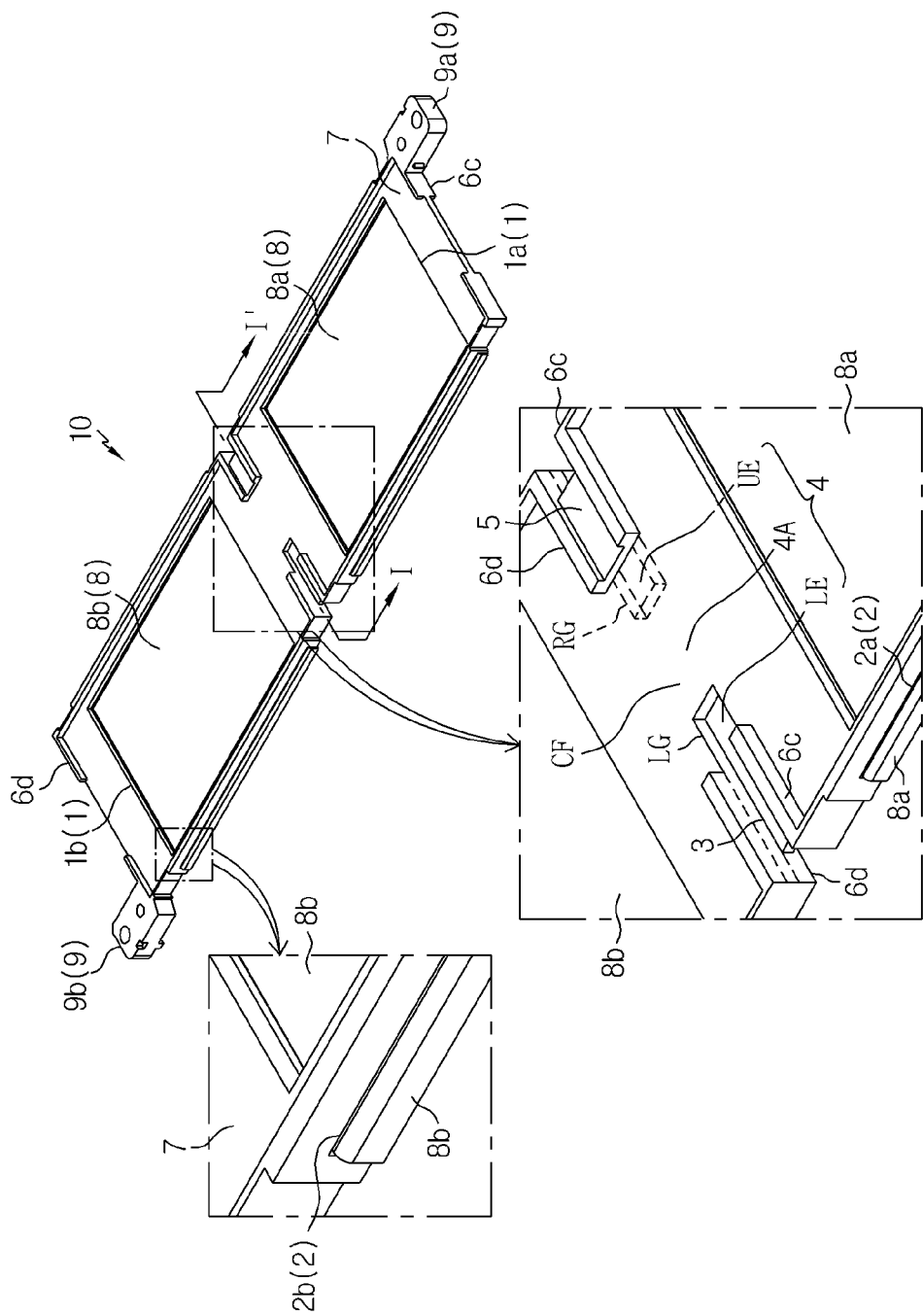
FIG. 4 is a perspective view illustrating in detail, the cartridge of FIG. 3.
Figure 5:
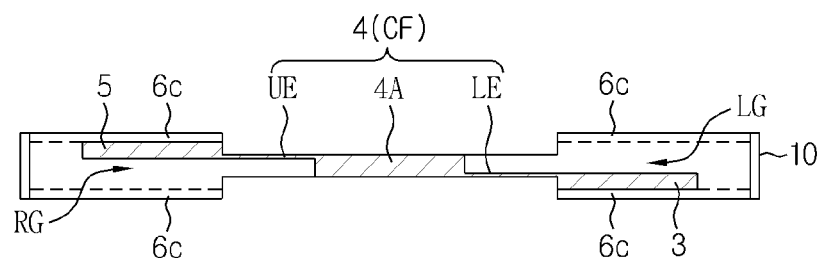
FIG. 5 is a cross-sectional view of the cartridge taken along a line I-I' of FIG. 4.

FIG. 4 is a perspective view illustrating in detail, the cartridge of FIG. 3, and FIG. 5 is a cross-sectional view of the cartridge taken along a line I-I' of FIG. 4.

Referring to FIGS. 3 through 5, total four battery cells 30A, 30B, 30C, and 30D are mounted two apiece on the lower portion and the upper portion of the cartridge 10. The cartridge 10 includes a mount frame 7 independently defining a space where a pair of battery cells are mounted in each of the upper portion and the lower portion, the cooling fins 8, and combining boards 9. An overall shape of the mount frame 7 is rectangular.

The mount frame 7 includes a pair of through windows 1 arranged along a length direction, slits 2 respectively penetrating two side walls adjacent to the through windows 1, and a left groove LG and a right groove RG respectively provided on the left and right of a center frame CF connecting the pair of through windows 1. Also, the mount frame 7 includes a lower sliding board 3, the lead mounting board 4, and an upper sliding board 5 at the center frame CF, and includes first and second mount fences 6c and 6d extending along an edge while respectively surrounding the pair of through windows 1.

The pair of through windows 1 are arranged to respectively correspond to the cooling fins 8 along a length direction of the mount frame 7. The slits 2 communicate with the through windows 1 by being provided along the length direction of the mount frame 7. The left groove LG and the right groove RG respectively correspond to the left groove portion LGP and the right groove portion RGP in the cartridge stack 10A of FIG. 2. The left groove LG and the right groove RG extend from two side portions of the cartridge 10 into the cartridge 10 between mount fences 6 along a width direction of the mount frame 7.

In FIGS. 3 through 5 and 8, the lower sliding board 3, the lead mounting board 4, and the upper sliding board 5 are integrated and sequentially provided along a width direction of the center frame CF. The lead mounting board 4 is provided between the lower sliding board 3 and the upper sliding board 5. The lead mounting board 4 provides, at the lower and upper portions of the cartridge 10, surfaces for mounting combined regions of the electrode leads 25a of FIG. 3 of the battery cells 30A, 30B, 30C, and 30D. In other words, an upper surface of the lead mounting board 4 provides, at the upper portion of the cartridge 10, a mounting surface to the combined end portions of the electrode leads 25a of the pair of battery cells 30A and 30B.

Similarly, a lower surface of the lead mounting board 4 provides, at the lower portion of the cartridge 10, a mounting surface to the combined end portions of the electrode leads 25a of the pair of battery cells 30C and 30D. The lower sliding board 3 and the upper sliding board 5 have a plate shape. Also, the lower sliding board 3 and the upper sliding board 5 are respectively provided on the left and right of the lead mounting board 4 to face each other diagonally, and extend towards the two side portions of the mount frame 7 by a certain length.

For example, a lower surface of the lower sliding board 3 is closer to a lower surface of the lead mounting board 4 than to an upper surface of the lead mounting board 4. The lower surface of the lower sliding board 3 forms a stepped portion with the lower surface of the lead mounting board 4 by being provided at a lower level than the lower surface of the lead mounting board 4. The lower sliding board 3 is connected to an end portion at one side of the lead mounting board 4 to partially cover the left groove LG below the left groove LG.

The lower sliding board 3 is provide below the left groove LG along a thickness direction of the mount frame 7 and protrudes from the lower surface of the lead mounting board 4. Similarly, an upper surface of the upper sliding board 5 is closer to the upper surface of the lead mounting board than to the lower surface of the lead mounting board 4. The upper surface of the upper sliding board 5 forms a stepped portion with the upper surface of the lead mounting board 4 by being provided at a higher level than the upper surface of the lead mounting board 4.

The upper sliding board 5 is connected to an end portion of the other side of the lead mounting board 4 to partially cover the right groove RG above the right groove RG. The upper sliding board 5 is provided on the right groove RG along the thickness direction of the mount frame 7 and protrudes from the upper surface of the lead mounting board 4.

The lead mounting board 4 includes a mounting plate 4A in a width direction of the center frame CF, a lower extension LE extending from a lower portion of the mounting plate 4A towards the lower sliding board 3 and having a plate shape forming a stepped portion with the lower sliding board 3, and an upper extension UE extending from an upper portion of the mounting plate 4A towards the upper sliding board 5 and having a plate shape forming a stepped portion with the upper sliding board 5.

The mounting plate 4A is provided between the left groove LG and the right groove RG. The lower extension LE is provided between the mounting plate 4A and the lower sliding board 3 to partially cover the left groove LG, and is connected to the lower sliding board 3 from the left groove LG. Preferably, the lower extension LE has a smaller thickness than the lower sliding board 3. Similarly, the upper extension UE is provided between the mounting plate 4A and the upper sliding board 5 to partially cover the right groove RG, and is connected to the upper sliding board 5 from the right groove RG.

Preferably, the upper extension UE has a smaller thickness than the upper sliding board 5. The first mount fences 6c define spaces for mounting the two battery cells 30A and 30C of FIG. 3 at the lower and upper portions of the mount frame 7, in front of the mount frame 7. Similarly, the second mount fences 6d define spaces for mounting the two battery cells 30B and 30D of FIG. 3 at the lower and upper portions of the mount frame 7, at the rear of the mount frame 7.

Preferably, the first and second mount fences 6c and 6d perpendicularly protrude from the edge of the mount frame 7 respectively towards the lower and upper portions of the mount frame 7 to have a height corresponding to the thickness of the battery cells 30A, 30B, 30C, and 30D. According to an embodiment, the first and second mount fences 6c and 6d are spaced by a width of the lower or upper sliding boards 3 or 5 along the length direction of the mount frame 7.

According to another embodiment, the first and second mount fences 6c and 6d are opened towards the lead mounting board 4 along the length direction of the mount frame 7. According to another embodiment, the first and second mount fences 6c and 6d include the lead drawing grooves 6a and 6b that are cut to expose the bent electrode leads 25b and 25c to the outside of the cartridge 10.

Here, the battery cells 30A and 30B may include the two combined electrode leads 25a provided on the lead mounting board 4 through the first and second mount fences 6c and 6d, and the electrode leads 25b and 26c respectively protruding from the lead drawing grooves 6a and 6b of the first and second mount fences 6c and 6d. Also, the battery cells 30C and 30D may include the two combined electrode leads 25a provided on the lead mounting board 4 through the first and second mount fences 6c and 6d, and the electrode leads 25b and 26c respectively protruding from the lead drawing grooves 6a and 6b of the first and second mount fences 6c and 6d.

According to another embodiment, the first and second mount fences 6c and 6d are connected to each other through the center frame CF. The cooling fins 8 are classified into first and second cooling fins 8a and 8b. The first and second cooling fins 8a and 8b are arranged and fixed respectively to a first through window 1a and a second through window 1b of the mount frame 7. In detail, the first cooling fin 8a covers the first through window 1a, is inserted into first slits 2a through an edge of the first through window 1a, and protrudes from the first slits 2a and is bent perpendicularly along a side wall of the mount frame 7.

Similarly, the second cooling fin 8b covers the second through window 1b, is inserted into second slits 2b through an edge of the second through window 1b, and protrudes from the second slits 2b and is bent perpendicularly along a side wall of the mount frame 7. Preferably, the first and second cooling fins 8a and 8b are integrated to the mount frame 7 via an insert injection molding. However, the present disclosure is not limited thereto.

The combining boards 9 are classified into first and second combining boards 9a and 9b. The first and second combining boards 9a and 9b diagonally face each other by protruding from the side walls of the mount frame 7 along the length direction of the mount frame 7. The first and second combining boards 9a and 9b are used for screw-coupling of the cartridges 10 when the plurality of cartridges 10 are sequentially stacked on each other.

In FIGS. 3 and 4, the battery cells 30A, 30B, 30C, and 30D are each provided in the first or second mount fence 6c and 6d. Here, the battery cells 30A and 30C surround the first cooling fin 8a in a sandwich structure, and the battery cells 30B and 30D surround the second cooling fin 8b in a sandwich structure.

Figure 6:
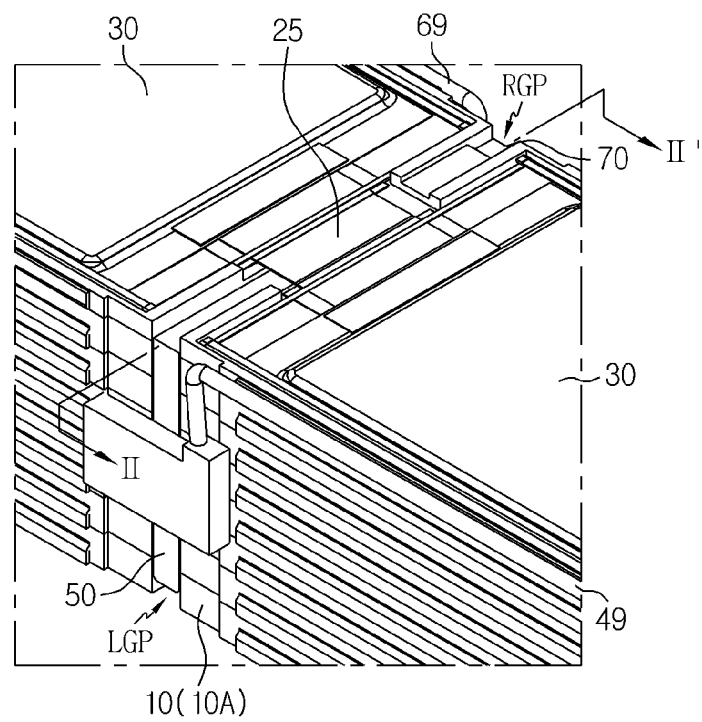
FIG. 6 is a partial perspective view partially illustrating a combination relationship of the cartridge stack, the plurality of battery cells, and the first and second middle sensing structures of FIG. 2.
Figure 7:
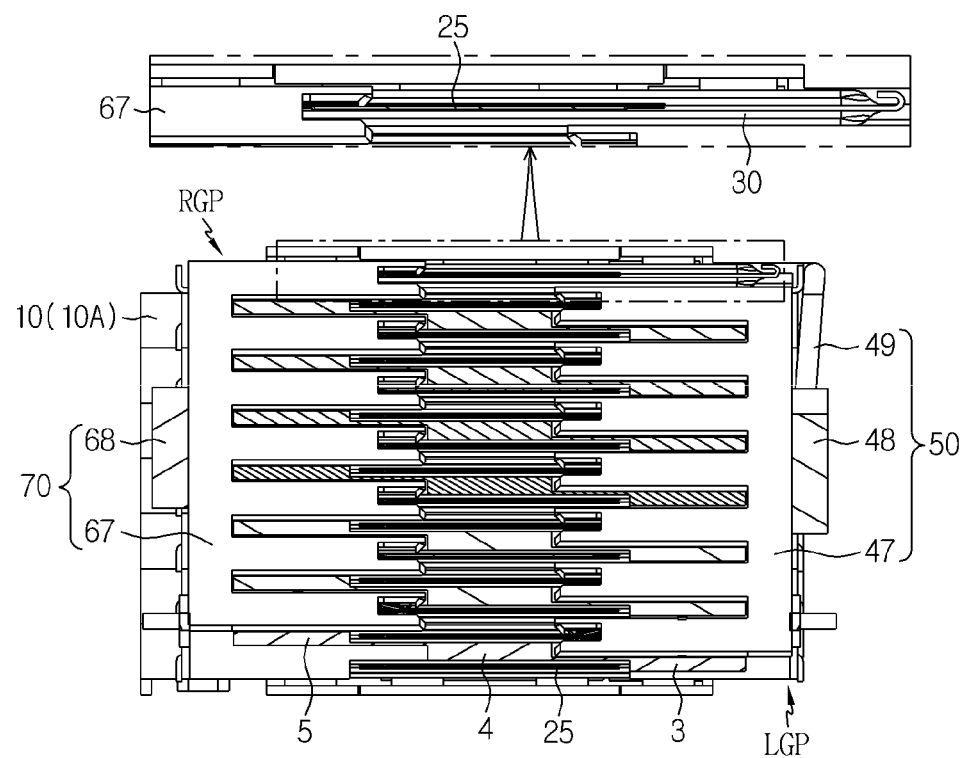
FIG. 7 is a cross-sectional view illustrating a combination relationship of the cartridges, the battery cells, and the first and second middle sensing structures taken along a line II-II' of FIG. 6.

FIG. 6 is a partial perspective view partially illustrating a combination relationship of the cartridge stack, the plurality of battery cells, and the first and second middle sensing structures of FIG. 2, and FIG. 7 is a cross-sectional view illustrating a combination relationship of the cartridges, the battery cells, and the first and second middle sensing structures taken along a line II-IP of FIG. 6. In FIG. 6, the cartridge stack is shown to expose an uppermost battery cell.

Figure 8:
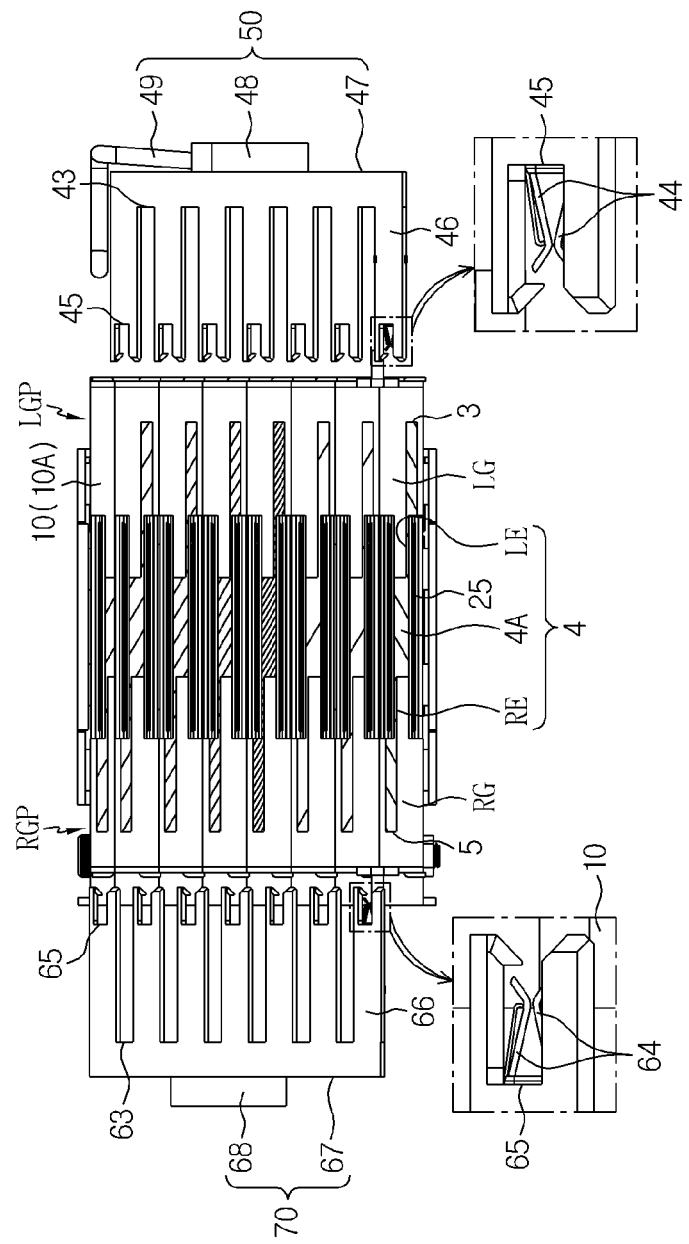
FIG. 8 is an exploded cross-sectional view of the cartridges, the battery cells, and the first and second middle sensing structures of FIG. 7.
Figure 9:
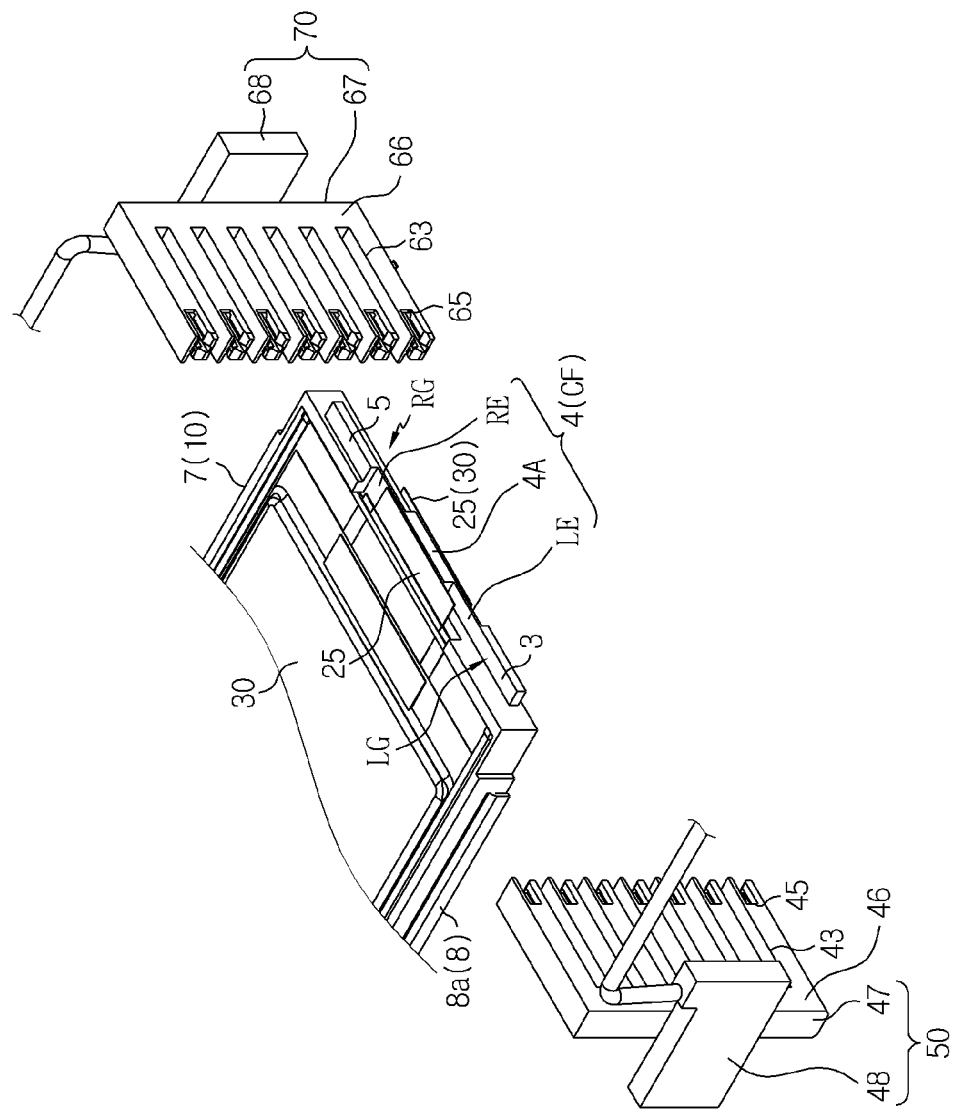
FIG. 9 is a partial perspective view partially illustrating the combination relationship of the cartridges, the battery cells, and the first and second middle sensing structures of FIG. 8.

Also, FIG. 8 is an exploded cross-sectional view of the cartridges, the battery cells, and the first and second middle sensing structures of FIG. 7, and FIG. 9 is a partial perspective view partially illustrating the combination relationship of the cartridges, the battery cells, and the first and second middle sensing structures of FIG. 8.

Referring to FIGS. 6 through 9, the first and second middle sensing structures 50 and 70 are respectively inserted into the left groove portion LGP and the right groove portion RGP provided in the center region of the cartridge stack 10A. Preferably, the first middle sensing structure 50 is inserted into the left groove portion LGP through a first middle connecting portion 47. Similarly, the second middle sensing structure 70 is inserted into the right groove portion RGP through a second middle connecting portion 67.

Here, the left groove portion LGP includes the number of left grooves LG equal to that of the cartridges 10. Similarly, the right groove portions RGP includes the number of right grooves RG equal to that of the cartridges 10. In the cartridge stack 10A, the uppermost cartridge 10 includes the left groove LG, the lead mounting board 4, and the right groove RG in the width direction. Each of the cartridges 10 below the uppermost cartridge includes the left groove LG, the lower sliding board 3, the lead mounting board 4, the upper sliding board 5, and the right groove RG in the width direction.

The first middle connecting portion 47 includes a plurality of first fingers 46. The first finger 46 includes a first connection slit 45 including a '⊐' D shaped groove at the end portion. The two adjacent first fingers 46 define one first insertion guide slit 43. The first insertion guide slit 43 and the first connection slit 45 are opened towards the left groove LG. In other words, the first insertion guide slit 43 is opened towards the lead mounting board 4 facing the first insertion guide slit 43, and the first connection slit 45 is opened towards the electrode lead 25 of the battery cell 30 facing the first connection slit 45.

Similarly, the second middle connecting portion 67 includes a plurality of second fingers 66. The second finger 66 includes a second connection slit 65 including a '⊂' shaped groove at the end portion. The two adjacent second fingers 66 define one second insertion guide slit 63. The second insertion guide slit 63 and the second connection slit 65 are opened towards the right groove RG. In other words, the second insertion guide slit 63 is opened towards the lead mounting board 4 facing the second insertion guide slit 63, and the second connection slit 65 is opened towards the electrode lead 25 of the battery cell 30 facing the second connection slit 65.

In FIGS. 7 and 8, the first middle sensing structure 50 slides to the lower sliding boards 3 of the cartridges 10 through the first insertion guide slits 43 of the first middle connecting portion 47 to accommodate the lower sliding boards 3 while being inserted into the left groove portion LGP of the cartridge stack 10A. Here, the first connection slit 45 of the first finger 46 contacts the electrode lead 25 by accommodating the end portion of the electrode lead 25 facing the first connection slit 45.

Similarly, the second middle sensing structure 70 slides to the upper sliding boards 5 of the cartridges 10 through the second insertion guide slits 63 of the second middle connecting portion 67 to accommodate the upper sliding boards 5 while being inserted into the right groove portion RGP of the cartridge stack 10A. Here, the second connection slit 65 of the second finger 66 contacts the electrode lead 25 by accommodating the end portion of the electrode lead 25 facing the second connection slit 65.

Preferably, the first and second middle connecting portions 47 and 67 are alternately provided in the left groove portion LGP and the right groove portion RGP of the cartridge stack 10A. In other words, the first finger 46 of the first middle connecting portion 47 faces the second insertion guide slit 63 of the second middle connecting portion 67. Similarly, the second finger 66 of the second middle connecting portion 67 faces the first insertion guide slit 43 of the first middle connecting portion 47.

In FIG. 8, the first and second connection slits 45 and 65 respectively include therein, first and second connection clips 44 and 64 formed of a metal. The first connection clip 44 elastically clips an end portion of the electrode lead 25 facing the first connection clip 44 in the left groove LG. Similarly, the second connection clip 64 elastically clips an end portion of the electrode lead 25 facing the second connection clip 64 in the right groove RG.

The first connection clip 44 is provided inside the first middle connecting portion 47 to be connected to a first leading wire (not shown) having conductivity. Similarly, the second connection clip 64 is provided inside the second middle connecting portion 67 to be connected to a second leading wire (not shown) having conductivity. The first middle sensing structure 50 includes a first movement blocking portion 48 combined to the first middle connecting portion 47, and a first wire portion 49 combined to the first movement blocking portion 48.

Here, the first leading wire extends from the first middle connecting portion 47 to the end portion of the first wire portion 49 sequentially through the inside of the first movement blocking portion 48 and the inside of the first wire portion 49. The first movement blocking portion 48 contacts the side wall of the cartridge stack 10A around the left groove portion LGP by being perpendicularly combined to the first middle connecting portion 47.

Similarly, the second middle sensing structure 70 includes a second movement blocking portion 68 combined to the second middle connecting portion 67, and a second wire portion 69 combined to the second movement blocking portion 68. Here, the second leading wire extends from the second middle connecting portion 67 to the end portion of the second wire portion 69 sequentially through the inside of the second movement blocking portion 68 and the inside of the second wire portion 69. The second movement blocking portion 68 contacts the side wall of the cartridge stack 10A around the right groove portion RGP by being perpendicularly combined to the second middle connecting portion 67.

Also, the first and second wire portions 49 and 69 extend in opposite directions by being provided along the side walls of the cartridge stack 10A from the first and second movement blocking portions 48 and 68. Here, the first wire portion 49 includes the number of first leading wires equal to that of the first connection clips 44. Similarly, the second wire portion 69 includes the number of second leading wires equal to that of the second connection clips 64.

Figure 10:
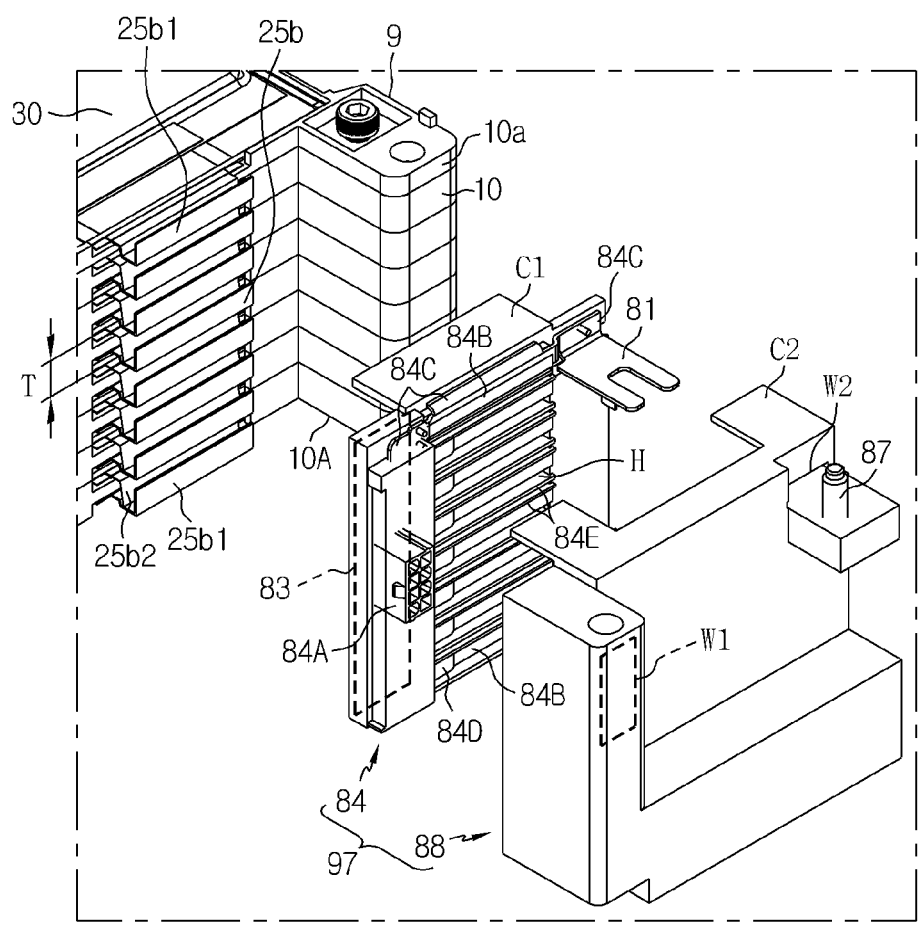
FIGS. 10 and 11 are enlarged exploded perspective views of a part of the cartridge stack, the plurality of battery cells, and the first and second end sensing structures of FIG. 2.
Figure 11:
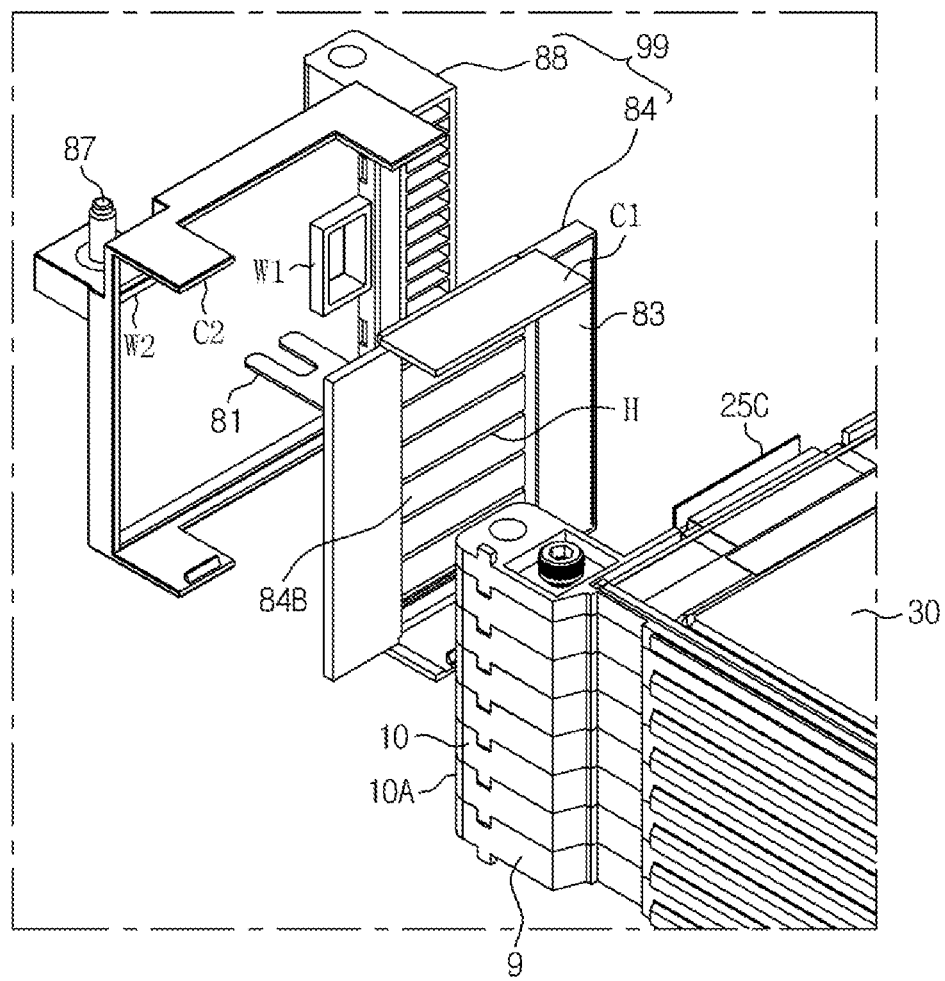
Figure 12:
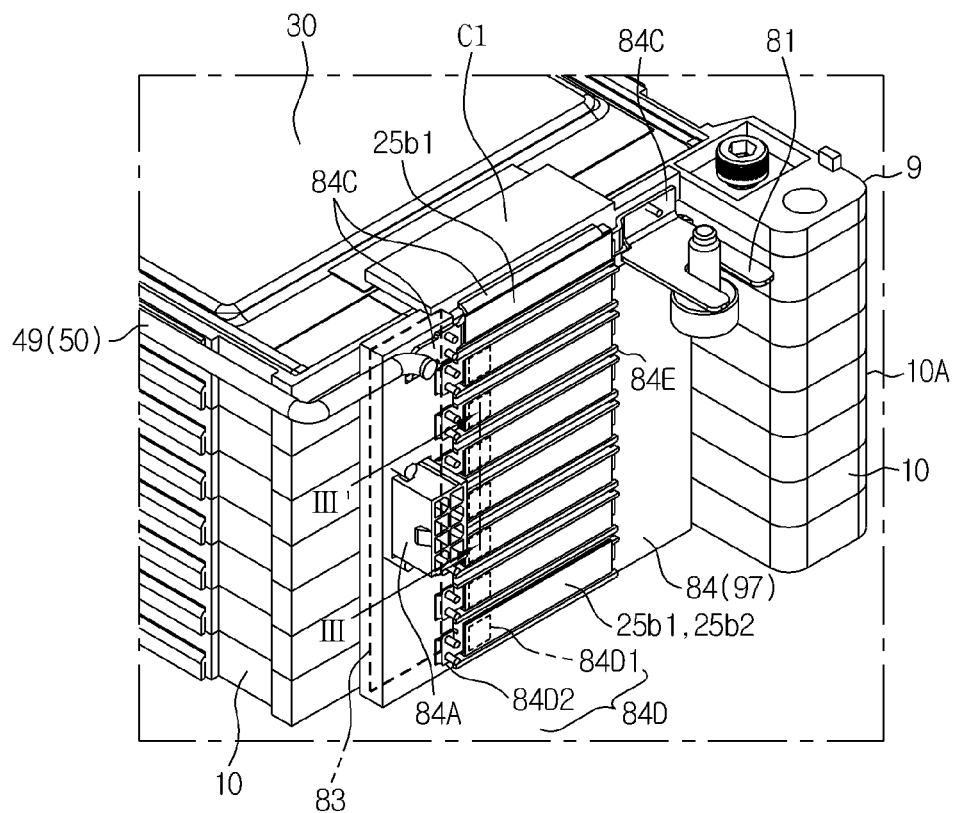
FIG. 12 is a partial perspective view partially illustrating a combination relationship of the part of the cartridge stack, the plurality of battery cells, and the first end sensing structure of FIG. 10.

FIGS. 10 and 11 are enlarged exploded perspective views of a part of the cartridge stack, the plurality of battery cells, and the first and second end sensing structures of FIG. 2, and FIG. 12 is a partial perspective view partially illustrating a combination relationship of the part of the cartridge stack, the plurality of battery cells, and the first end sensing structure of FIG. 10.

Figure 13:
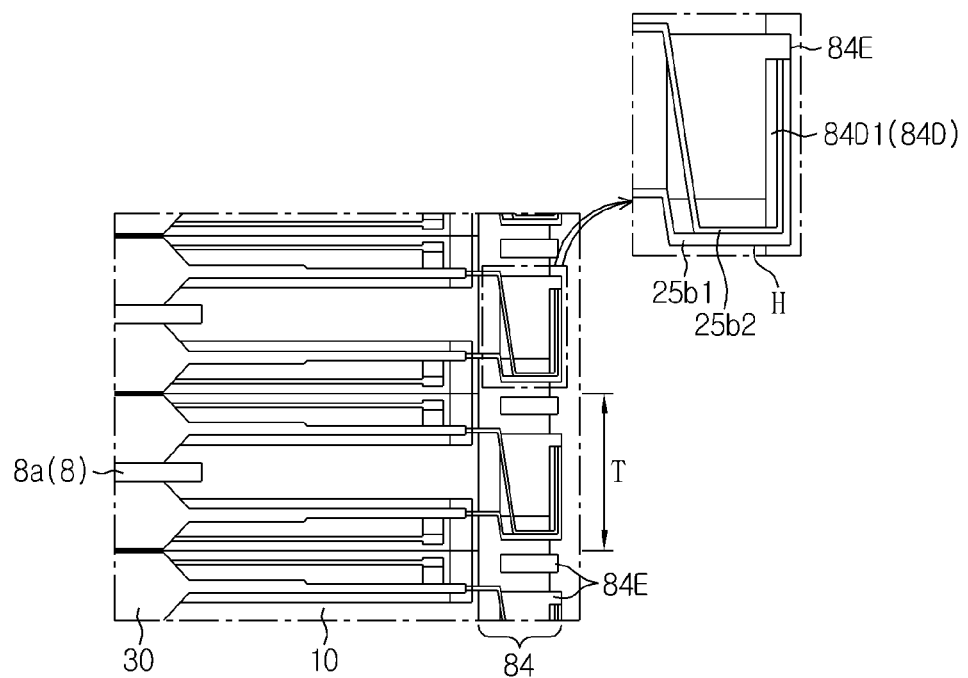
FIG. 13 is a partial cross-sectional view partially illustrating the part of the cartridge stack, the battery cells, and the first end sensing structure taken along a line III-III' of FIG. 12.
Figure 14:
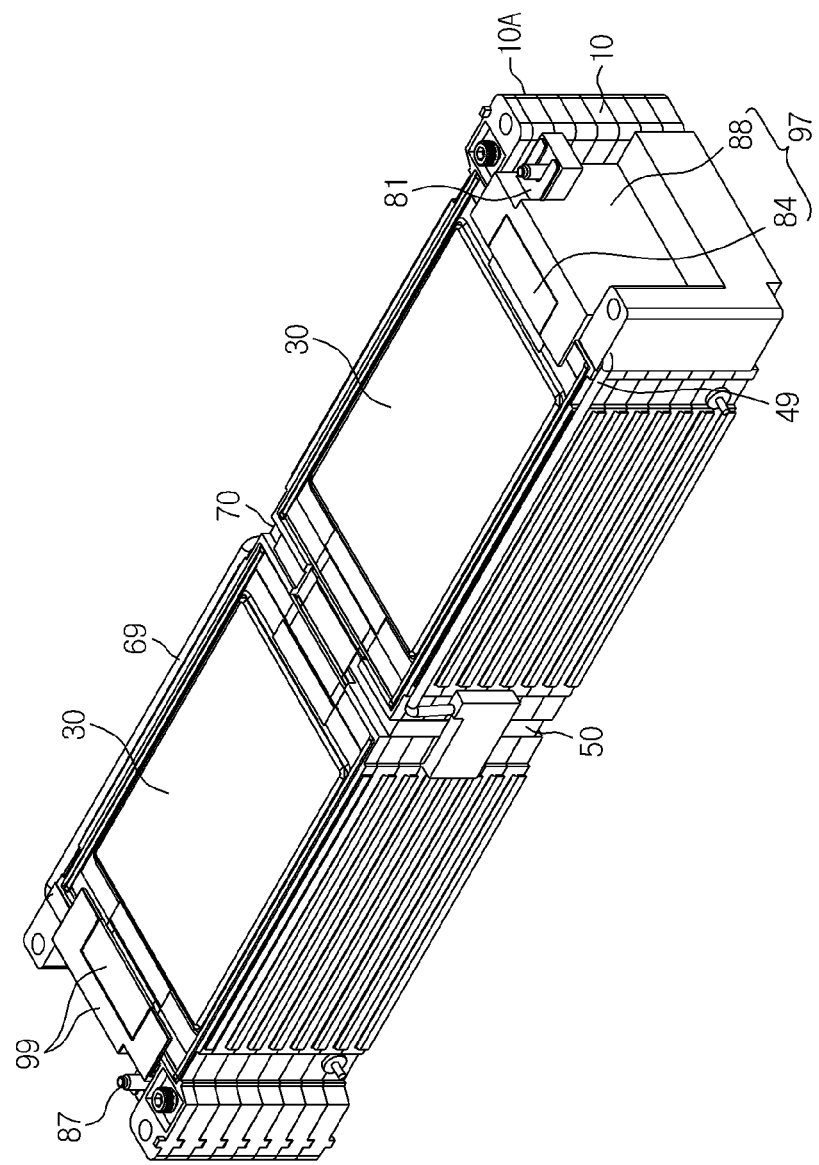
FIG. 14 is a perspective view of a cartridge stack, a plurality of battery cells, first and second middle sensing structures, and first and second end sensing structures of FIG. 1.

FIG. 13 is a partial cross-sectional view partially illustrating the part of the cartridge stack, the battery cells, and the first end sensing structure taken along a line III-III' of FIG. 12, and FIG. 14 is a perspective view of a cartridge stack, a plurality of battery cells, first and second middle sensing structures, and first and second end sensing structures of FIG. 1.

Referring to FIGS. 10 through 14, the first and second end sensing structures 97 and 99 are respectively provided in front of and at the rear of the cartridge stack 10A along the length direction of the cartridge stack 10A. The first end sensing structure 97 has the same shape as the second end sensing structure 99. Each of the first and second end sensing structures 97 and 99 includes the voltage sensing module 84 and the insulating cover 88.

The voltage sensing module 84 includes a printed circuit board 83 on an inner perimeter surface facing the cartridges 10 at an edge of one side, and a connector 84A electrically connected to the printed circuit board 83 on an outer perimeter surface facing the insulating cover 88. Preferably, the printed circuit board 83 includes a circuit performing a voltage measuring function of each battery cell 30, and the connector 84A is used as an interface externally outputting a measured voltage of each battery cell 30.

The printed circuit board 83 of the first end sensing structure 97 is electrically connected to the first wire portion 49 of the first middle sensing structure 50. Accordingly, the printed circuit board 83 may sense electric potential of the electrode lead 25 contacting the first middle sensing structure 50. Similarly, the printed circuit board 83 of the second end sensing structure 99 is electrically connected to the second wire portion 69 of FIG. 6 of the second middle sensing structure 70.

Accordingly, the printed circuit board 83 may sense electric potential of the electrode lead 25 contacting the second middle sensing structure 70. The connector 84A of the first end sensing structure 97 may be externally exposed by penetrating the insulating cover 88 through a first window W1 provided at one edge of the insulating cover 88. Such a structure is identically applied to the second end sensing structure 99.

The voltage sensing module 84 includes support ribs 84B sequentially stacked in the center region, the first sensing bus bar 84C on the uppermost support rib 84B, the second sensing bus bar 84D provided on each of the support ribs 84B below the uppermost support rib 84B, and a lead insulating pattern 84E and a lead drawing slit H sequentially provided between the two adjacent support ribs 84B.

Here, the support rib 84B and the lead insulating pattern 84E are formed of plastic. The first sensing bus bar 84C and the second sensing bus bar 84D are formed of a metal. The uppermost cartridge 10a of the cartridge stack 10A bends and draws out an uppermost electrode lead 25b1, and each cartridge 10 below the uppermost cartridge 10a bends and draws out lower and upper electrode leads 25b1 and 25b2.

The cartridge 10 has a certain thickness T. The lower and upper electrode leads 25b1 and 25b2 overlap and contact each other. While the cartridge stack 10A and the voltage sensing module 84 are combined, the uppermost lead drawing slit H accommodates the uppermost electrode lead 25b1, and each lead drawing slit H below the uppermost lead drawing slit H accommodates the lower and upper electrode leads 25b1 and 25b2.

In the voltage sensing module 84, the uppermost electrode lead 25b1 is bent from the uppermost lead drawing slit H to the uppermost support rib 84B and the first sensing bus bar 84C through the uppermost lead drawing slit H. The first sensing bus bar 84C surrounds the uppermost support rib 84B, and is connected to the printed circuit board 83 through one end portion and to a terminal bus bar 81 through the other end portion.

The first sensing bus bar 84C is combined to the uppermost electrode lead 25b1 on the uppermost support rib 84B via laser welding. The terminal bus bar 81 is electrically connected to the print circuit board and has a negative (−) or positive (+) electric polarity. Similarly, the lower and upper electrode leads 25b1 and 25b2 are bent from the lead drawing slit H to the support rib 84B and the second sensing bus bar 84D through each lead drawing slit H below the uppermost lead drawing slit H.

The second sensing bus bar 84D is provided at one side portion of each lead drawing slit H below the uppermost lead drawing slit H to be electrically connected to the printed circuit board 83. The second sensing bus bar 84D is combined to the lower and upper electrode leads 25b1 and 25b2 on the support rib 84B via laser welding.

Here, the second sensing bus bar 84D includes a connection tap 84D1 contacting the lower and upper electrode leads 25b1 and 25b2, and an access tap 84D2 exposed at the lower and upper electrode leads 25b1 and 25b2 and extending to the printed circuit board 83. The lead insulating pattern 84E electrically insulates the two adjacent first and second sensing bus bars 84C and 84D, or electrically insulates the two adjacent second sensing bus bars 84D below the first sensing bus bar 84C.

In other words, the lead insulating pattern 84E is provided below each lead drawing slit H to electrically insulate the lower and upper electrode leads 25b1 and 25b2 from the uppermost electrode lead 25b1 or electrically insulate the two pairs of adjacent lower and upper electrode leads 25b1 and 25b2.

In detail, the voltage sensing module 84 of the first end sensing structure 97 may, at the front of the cartridge stack 10A, combine the uppermost electrode lead 25 to the first sensing bus bar 84C by inserting the uppermost electrode lead 25b1 of the uppermost battery cell 30 to the uppermost lead drawing slit H, and combine the pair of electrode leads 25b1 and 25b2 to the second sensing bus bar 84D by inserting the pair of electrode leads 25b1 and 25b2 of the two adjacent battery cells 30 to each lead drawing slit H below the uppermost lead, drawing slit H.

Similarly, the voltage sensing module 84 of the second end sensing structure 99 may, at the real of the cartridge stack 10A, combine the lowermost electrode lead 25c to the second sensing bus bar 84D by inserting the lowermost electrode lead 25c of the lowermost battery cell 30 to the lowermost lead drawing slit H, and combine the pair of electrode leads 25c to the first sensing bus bar 84C or second sensing bus bar 84D by inserting the pair of electrode leads 25c of the two adjacent battery cells 30 to each lead drawing slit H above the lowermost lead drawing slit H.

In this case, the combination of the electrode leads 25b with the voltage sensing module 84 of the first end sensing structure 97, and the combination of the electrode leads 25c with the voltage sensing module 84 of the second end sensing structure 99 electrically connect the battery cells 30 provided in the cartridge stack 10A in series.

In FIGS. 8 and 14, after the cartridge stack 10A, the first and second middle sensing structures 50 and 70, and the first and second end sensing structures 97 and 99 are combined, the first middle sensing structure 50 may contact, for example, an even-th pair of battery cells 30 according to a stacked order of the pair of battery cells 30 on the same level in the cartridge stack 10A, and the second middle sensing structure 70 may contact, for example, an odd-th pair of battery cells 30 according to the stacked order of the pair of battery cells 30 on the same level in the cartridge stack 10A.

Here, the first middle sensing structure 50 and the first end sensing structure 97 sense a voltage of one of the even-th pair of battery cells 30, and the second middle sensing structure 70 and the second end sensing structure 99 sense a voltage of one of the odd-th pair of battery cells 30. Meanwhile, the voltage sensing module 84 of the first end sensing structure 97 covers an occupied region of the uppermost electrode lead 25b through a first cover C1.

Similarly, the voltage sensing module 84 of the second end sensing structure 99 covers an occupied region of the uppermost electrode lead 25c through the first cover C1. Also, the insulating cover 88 covers the voltage sensing module 84. Here, the terminal bus bar 81 is combined to an electrode terminal 87 by penetrating the insulating cover 88 through a second window W2 provided at another edge of the insulating cover 88. A second cover C2 of the insulating cover 88 surrounds the first cover C1 of the voltage sensing module 84 on the cartridge stack 10A.

Figure 15:
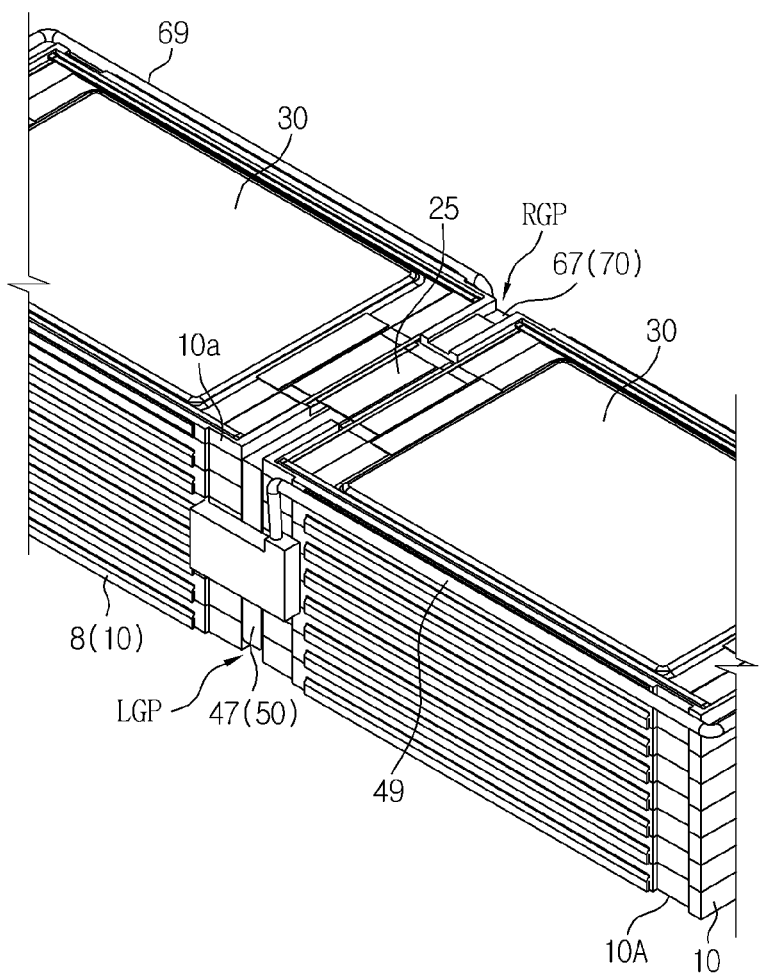
FIGS. 15 and 16 are perspective views for describing a method of manufacturing the battery module of FIG. 1.

FIGS. 15 and 16 are perspective views for describing a method of manufacturing the battery module of FIG. 1.

Referring to FIGS. 15 and 16, the cartridge stack 10A, the battery cells 30, and the first and second middle sensing structures 50 and 70 may be prepared as shown in FIG. 1. The cartridge stack 10A may be formed by sequentially stacking the cartridges 10. The thickness of the uppermost cartridge 10a may be half of the thickness of the cartridge 10 below the uppermost cartridge 10a.

Each of the cartridges 10 may have two cooling fins 8 provided on the same level. The cooling fins 8 may cover the first and second through windows 1a and 1b of FIG. 4 of the cartridge 10, and protrude from the two side walls adjacent to the first and second through windows 1a and 1b to be bent along the side walls. While the cartridges 10 are stacked, the two battery cells 30 may be provided at the upper portion of the uppermost cartridge 10a, and the battery cells 30 may be provided two apiece at the lower portion and the upper portion of the cartridge 10 below the uppermost cartridge 10a.

In the cartridge stack 10A, the lower and upper battery cells 30 surround one cooling fin 8 in a sandwich structure in front of or at the rear of one cartridge 10, excluding the uppermost cartridge 10a. Then, the first middle sensing structure 50 may be partially inserted into the left groove portion LGP of the cartridge stack 10A through the first middle connecting portion 47 to contact the even-th pair of battery cell 30 in the stacked order of the pair of battery cells 30 in the cartridge stack 10A.

Here, the first middle sensing structure 50 may include the first wire portion 49 extending from the left groove portion LOP of the cartridge stack 10A to the front of the cartridge stack 10A. The first wire portion 49 may be electrically connected to the even-th pair of battery cells 30. The second middle sensing structure 70 may be partially inserted into the right groove portion RGP of the cartridge stack 10A through the second middle connecting portion 67 to contact the odd-th pair of battery cells 30 in the stacked order of the pair of battery cells 30 in the cartridge stack 10A.

Here, the second middle sensing structure 70 may include the second wire portion 69 extending from the right groove portion RGP of the cartridge stack 10A to the back of the cartridge stack 10A. The second wire portion 69 may be electrically connected to the odd-th pair of battery cells 30. The combination of the cartridge stack 10A, the battery cells 30, and the first and second middle sensing structures 50 and 70 has been described in detail above with reference to FIGS. 3 through 9.

Then, the heat transfer pads 91 and 93, the lower and upper end plates 95A and 95B, the first and second end sensing structure 97 and 99, and the side plates 100 and 110 may also be prepared as shown in FIG. 1. The heat transfer pads 91 and 93 may cover the cooling fins 8 of the cartridges 10. The lower and upper end plates 95A and 95B may be respectively provided below and above the cartridge stack 10A.

Functions of the heat transfer pads 91 and 93 and lower and upper end plates 95A and 95B have been described with reference to FIGS. 1 and 2. Then, the lower and upper end plates 95A and 95B may be screw-combined with the cartridge stack 10A through the combining boards 9 of the cartridges 10. Next, the first and second end sensing structures 97 and 99 may be respectively provided on a front portion and a rear portion of the cartridge stack 10A. The first and second end sensing structures 97 and 99 may be electrically connected to the electrode leads 25 of the battery cells 30 exposed from the cartridges 10.

The combination of the cartridges 10, the battery cells 30, and the first and second end sensing structures 97 and 99 has been described above with reference to FIGS. 10 through 14. Here, since the first end sensing structure 97 is electrically connected to the first wire portion 49 of the first middle sensing structure 50, the first middle sensing structure 50 and the first end sensing structure 97 may sense the voltage of the even-th battery cell 30 in the stacked order of the pair of battery cells 30 in the cartridge stack 10A.

Similarly, since the second end sensing structure 99 is electrically connected to the second wire portion 69 of the second middle sensing structure 70, the second middle sensing structure 70 and the second end sensing structure 99 may sense the voltage of the odd-th battery cell 30 in the stacked order of the pair of battery cell 30 in the cartridge stack 10A.

Accordingly, each of the first and second end sensing structures 97 and 99 may sense the voltage of the battery cell 30 and transmit an electric signal to a battery management system (not shown). The side plates 100 and 110 may be provided on the heat transfer pads 91 and 93. The side plates 100 and 110 may be screw-combined with the lower and upper end plates 95A and 95B.

As such, the cartridge stack 10A, the battery cells 30, the first and second middle sensing structure 50 and 70, the heat transfer pads 91 and 93, the lower and upper end plates 95A and 95B, the first and second end sensing structures 97 and 99, and the side plates 100 and 110 may configure the battery module 120.

The scope of the present disclosure is indicated by the claims which will be described in the following rather than the detailed description of the disclosure, and it should be understood that the claims and all modifications or modified forms drawn from the concept of the claims are included in the scope of the present disclosure.

What is claimed is:

1. A cartridge comprising:
a mount frame comprising a pair of through windows provided sequentially in a length direction, and a first sliding board, a lead mounting board, and a second sliding board sequentially provided in a width direction between the pair of through windows; and
first and second cooling fins respectively covering the pair of through windows,
wherein the first sliding board is provided on a first side of the lead mounting board, and the second sliding board is provided on a second side of the lead mounting board, the second side of the lead mounting board being different from the first side of the lead mounting board,
wherein the first sliding board extends below the lead mounting board in a height direction of the cartridge, the height direction being perpendicular to the length direction and the width direction,
wherein the second sliding board extends above the lead mounting board in the height direction, and
wherein the first and second sliding boards do not overlap the lead mounting board when viewed in the height direction.

2. The cartridge of claim 1, wherein the mount frame further comprises mount fences respectively surrounding the pair of through windows,
wherein the mount fences are located along an edge of the mount frame and protrude toward a first portion and a second portion of the mount frame, and
wherein each mount fence abuts against the first and second sliding boards.

3. The cartridge of claim 2, wherein the mount fences are opened towards the lead mounting board, and comprise lead drawing grooves respectively at the first portion and the second portion of the mount frame on an opposite side of the lead mounting board, and
wherein the lead drawing grooves extend in the height direction and are configured to expose electrode leads to outside of the cartridge.

4. The cartridge of claim 2, wherein the mount fences are spaced from each other by a width of the first sliding board or the second sliding board in the length direction of the mount frame.

5. The cartridge of claim 1, wherein the mount frame comprises a first groove and a second groove in the width direction between the pair of through windows,
wherein the first sliding board is provided below the first groove in the height direction to partially cover the first groove, and
wherein the second sliding board is provided above the second groove in the height direction to partially cover the second groove.

6. The cartridge of claim 5, wherein the lead mounting board is provided between the first sliding board and the second sliding board to contact the first sliding board and the second sliding board at the first groove and the second groove, respectively.

7. The cartridge of claim 5, wherein the lead mounting board comprises:
   a mounting plate between the first groove and the second groove;
   a first extension extending from a first portion of the mounting plate to the first groove and connected to the first sliding board; and
   a second extension extending from a second portion of the mounting plate to the second groove and connected to the second sliding board.

8. The cartridge of claim 7, wherein the first extension has a thickness smaller than the first sliding board, and
   the second extension has a thickness smaller than the second sliding board.

9. The cartridge of claim 1, wherein the mount frame comprises first and second slits, the first slit penetrating a first side wall of the mount frame adjacent to a first through window of the pair of through windows and the second slit penetrating a second side wall of the mount frame adjacent to a second through window of the pair of through windows,
   wherein the first and second slits are provided on a same side of the mount frame, and
   wherein the first and second slits communicate with the first and second through windows, respectively.

10. The cartridge of claim 9, wherein the first and second cooling fins are inserted into the first and second slits, respectively, and are perpendicularly bent along the first and second side walls of the mount frame, respectively.

11. A battery module comprising:
    a cartridge stack comprising a plurality of cartridges that are sequentially stacked, wherein each of the plurality of cartridges comprises: a mount frame comprising a pair of through windows provided sequentially in a length direction, and a first groove, a lead mounting board, and a second groove sequentially provided in a width direction between the pair of through windows; and cooling fins respectively covering the pair of through windows;
    battery cells provided two apiece at a second portion of the mount frame or at each of a first portion and the second portion of the mount frame of each of the plurality of cartridges, wherein each of the battery cells comprises a pair of electrode leads heading opposite directions to each other, and in two battery cells located in a same level, combined end portions of facing electrode leads are provided on the lead mounting board, one of the pair of electrode leads is exposed at a first surface of the cartridge stack, and the other one of the pair of electrode leads is exposed at a second surface of the cartridge stack, the first surface of the cartridge stack being opposite to the second surface of the cartridge stack;
    first and second middle sensing structures inserted into the first groove and the second groove of each of the plurality of cartridges, and alternately electrically connected to the combined end portions of electrode leads in the plurality of cartridges; and
    first and second end sensing structures respectively provided at the first surface and the second surface of the cartridge stack and electrically connected to electrode leads exposed at the first surface and electrode leads exposed at the second surface,
    wherein each of cartridges below, in a height direction, an uppermost cartridge from among the plurality of cartridges, comprises:
    a first sliding board and a second sliding board provided on first and second sides of the lead mounting board, respectively, the first side of the lead mounting board being opposite to the second side of the lead mounting board, the first sliding board extending below the lead mounting board in a height direction of the cartridge, the height direction being perpendicular to the length direction and the width direction, the second sliding board extending above the lead mounting board in the height direction, and the first and second sliding boards do not overlap the lead mounting board when viewed in the height direction.

12. The battery module of claim 11, wherein, from among the plurality of cartridges, a thickness of an uppermost cartridge is half of a thickness of each of remaining cartridges.

13. The battery module of claim 11, wherein the battery cells are electrically connected to each other in series by the electrode leads exposed at the front surface and the rear surface of the cartridge stack.

14. The battery module of claim 11, wherein for each cartridge below the uppermost cartridge:
    the mount frame further comprises a mount fence at the second portion or at the first and second portions of each of the plurality of cartridges,
    the mount fence perpendicularly protrudes in a height corresponding to a thickness of each of the battery cells, and
    each mount fence abuts against the first and second sliding boards.

15. The battery module of claim 11, wherein for each cartridge below the uppermost cartridge:
    the mount frame further comprises mount fences, each mount fence surrounding the two battery cells located in the same level,
    wherein each mount fence is opened towards the lead mounting board and comprises a lead drawing groove on an opposite side of the lead mounting board exposing the pair of electrode leads.

16. The battery module of claim 11, wherein for each cartridge below the uppermost cartridge:
    the first sliding board is provided below the first groove in the height direction to partially cover the first groove,
    the second sliding board is provided above the second groove in the height direction to partially cover the second groove, and
    the lead mounting board is connected to the first sliding board through the first groove and to the second sliding board through the second groove.

17. The battery module of claim 11, wherein for each cartridge below the uppermost cartridge:
    the mount frame further comprises first and second slits, the first slit penetrating a first side wall of the mount frame adjacent to a first through window of the pair of through windows and the second slit penetrating a second side wall of the mount frame adjacent to a second through window of the pair of through windows,
    the first and second slits are provided on a same side of the mount frame, and
    the cooling fins are inserted into respective slits through edges of the pair of through windows, protrude from the slits to perpendicularly bend along the first and second side walls of the mount frame, and are surrounded by two battery cells in a sandwich structure.

18. The battery module of claim 11, wherein the first middle sensing structure comprises a first middle connecting portion inserted into each of the first grooves of the plurality of cartridges, and a first movement blocking portion combined to the first middle connecting portion.

19. The battery module of claim 18, wherein the first middle connecting portion comprises a plurality of first fingers, a first connection slit at an end portion of each of the plurality of first fingers, and a first insertion guide slit between two adjacent first fingers, wherein the first connection slit is opened towards the combined end portions of the facing electrode leads, and the first insertion guide slit is opened towards the lead mounting board facing the first insertion guide slit.

* * * * *